Figure 2:
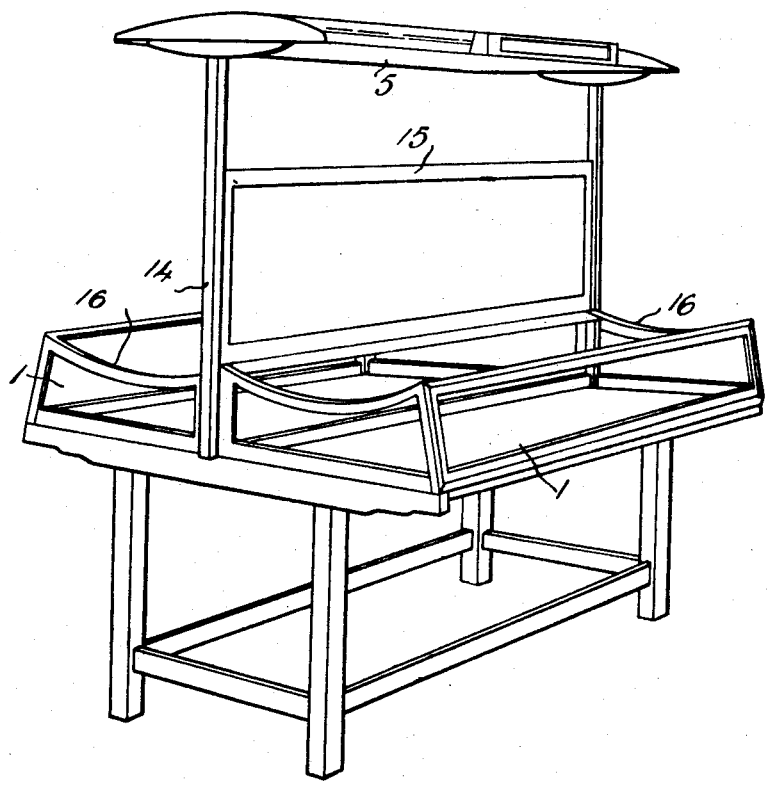

Sept. 25, 1934.  G. BROWN  1,975,001
MEANS FOR NULLIFYING OR REDUCING REFLECTIONS IN SHOW CASES OR THE LIKE
Filed May 11, 1933   2 Sheets-Sheet 1
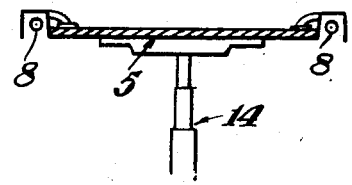
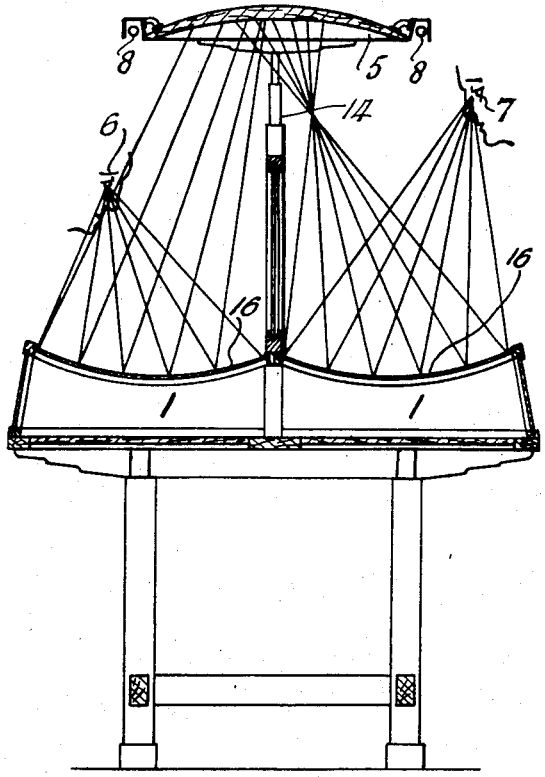

Sept. 25, 1934.   G. BROWN   1,975,001
MEANS FOR NULLIFYING OR REDUCING REFLECTIONS IN SHOW CASES OR THE LIKE
Filed May 11, 1933    2 Sheets-Sheet 2

UNITED STATES PATENT OFFICE 1,975,001

MEANS FOR NULLIFYING OR REDUCING REFLECTIONS IN SHOW CASES OR THE LIKE

Gerald Brown, Barnes, London, England

Application May 11, 1933, Serial No. 670,553
In Great Britain May 12, 1932

5 Claims. (Cl. 88—1)

This invention relates to means for nullifying or reducing reflections in display devices such as show cases or the like, According to this invention the top surface of a show case or the like preferably comprises two curved panes of glass or like transparent material so arranged as to take the field of reflected view away from the ordinary outside objects to a region providing no objectionable reflections, said region being a light absorbing surface or a surface of uniformly low luminosity and being positioned above said curved panes and approximately in a horizontal plane.

The curved panes are preferably arranged with the concave surface uppermost whilst preferably the light absorbing surface is also curved the concave surface thereof facing the concave surface of the curved panes. The light absorbing surface is preferably supported by the show case and may conveniently form a fitting or shade for an electric light bulb or bulbs.

The invention is illustrated in the accompanying drawings in which Figure 1 is a transverse vertical section of one form of show case i. e. a museum case in accordance with the invention. Figure 2 is a perspective view of the museum case illustrated in Figure 1, and Figure 3 is a detail cross sectional view illustrating a modified or non-curved form of light absorbing surface equipment.

In the construction shown in Figure 1 the top surface of the museum case 1 comprises two curved panes of glass or like transparent material 16 converging together at approximately a cusp along the centre line of the case, the concave faces of the curved panes being uppermost.

In the arrangement shown in the drawings which illustrate the invention as applied to a museum case, the light absorbing surface 5 is supported above the case 1 at each end by a stanchion 14 forming part of the case frame and also a casing 15 for printed matter such for example as descriptive matter of the contents of the case 1. The top surface of the case on each side of the stanchions 14 and casing 15 comprises a single continuous curved pane of glass 16, the concave surfaces of which are uppermost and which converge together at approximately a cusp along the bottom of the casing 15. In Figure 1 the rays from two view points 6, 7 of different heights are shown whereby rays reflected from the curved panes of glass 16 are led to the light absorbing surface 5. The light absorbing surface 5 is shown curved similarly to the panes of glass or like transparent material 16. The concave surface of the light absorbing surface faces the concave surfaces of the curved panes of glass and is so positioned with respect to the said panes of glass that the field of reflected view from the panes of glass is led away from the ordinary outside objects to the light absorbing surface. Instead of the light absorbing surface 5 being curved as shown in Figure 1 it may be formed from a flat surface and may also have incorporated therein a fitting or fittings for electric light bulbs 8 for supplying light to the show case positioned below. See Figure 3.

It will be appreciated that in all the constructions herein before described the light absorbing surfaces are so situated that no direct rays of light can fall upon them and hence their property of absorbing light is maintained as perfect as possible.

What I claim is:—

1. A display device consisting of a show case the top surface of which comprises two curved panes of transparent material such as glass, converging together at approximately a cusp along the centre line of the show case with their concave surfaces uppermost, and a single light absorbing surface on to which the field of reflected view from the ordinary outside objects is led, said single light absorbing surface being positioned approximately horizontally and spaced vertically above said curved panes and being extended over a substantial portion of each pane.

2. A display device consisting of a show case the top surface of which comprises two curved panes of transparent material such as glass, converging together at approximately a cusp along the centre line of the show case with their concave surfaces uppermost, and a light absorbing surface on to which the field of reflected view from the ordinary outside objects is led, said light absorbing surface being positioned approximately horizontally and above said curved panes, and being curved similarly to the curved panes, the concave surface of said region facing the concave surfaces of the curved panes.

3. A display device consisting of a show case comprising at least one curved pane of transparent material, such as glass, a single light absorbing surface and means carried by said show case for supporting said light absorbing surface approximately horizontally and in vertically spaced relationship above said curved pane, said light absorbing surface extending over a substantial portion of said pane, said pane and light absorbing surface being so arranged as to take the field of reflected view from said curved pane away from the ordinary outside objects to said light absorbing surface.

4. A display device consisting of a show case the top surface of which comprises two curved panes of transparent material such as glass, converging together at approximately a cusp along the centre line of the show case with their concave surfaces uppermost, and a single light absorbing surface on to which the field of reflected view from the ordinary outside objects is led, and means carried by said show case for supporting said single light absorbing surface approximately horizontally and spaced vertically above said curved panes and being extended over a substantial portion of each pane.

5. A display device consisting of a show case the top surface of which comprises two curved panes of transparent material such as glass, converging together at approximately a cusp along the centre line of the show case with their concave surfaces uppermost, and a light absorbing surface on to which the field of reflected view from the ordinary outside objects is led, and means carried by said show case for supporting said region approximately horizontally above said curved panes, the light absorbing surface being curved similarly to the curved panes and its concave surface facing the concave surfaces of the curved panes.

GERALD BROWN.